United States Patent [19]

Schafer et al.

[11] 3,801,160
[45] Apr. 2, 1974

[54] HYDRAULIC PRESSURE MODULATOR
[75] Inventors: Thomas C. Schafer; Martin A. Shields, both of South Bend, Ind.
[73] Assignee: The Bendix Corporation, South Bend, Ind.
[22] Filed: Nov. 24, 1972
[21] Appl. No.: 309,012

[52] U.S. Cl. .......... 303/21 F, 137/493.7, 188/181 A
[51] Int. Cl. .............................................. B60t 8/06
[58] Field of Search .......................... 303/21, 61–63, 303/68–69, 6 C, 6 R; 188/181; 137/493.6, 493.7, 493, 493.1

[56] References Cited
UNITED STATES PATENTS
| | | | |
|---|---|---|---|
| 3,549,210 | 12/1970 | Birge et al. | 303/21 F |
| 3,610,702 | 10/1971 | MacDuff | 303/21 F |
| 3,677,608 | 7/1972 | Lewis | 303/21 F |

Primary Examiner—Duane A. Reger
Assistant Examiner—D. C. Butler
Attorney, Agent, or Firm—Ken C. Decker; William N. Antonis

[57] ABSTRACT

An adaptive braking modulator is disclosed which includes a housing defining a bore therewithin and a piston slidably mounted in the bore which defines a pair of chambers between opposite ends of the piston and corresponding ends of the bore. One of the chambers is communicated to the vehicle's master cylinder, and the other chamber is communicated to the vehicle's fluid pressure actuated brakes. A passage extends through the piston to communicate one of the chambers with the other chambers, and a check valve is provided in the passage to control flow of fluid therethrough. An actuating stem extends from the check valve and projects from one end of the piston. The actuating rod maintains the check valve open when the one end of the piston is urged into engagement with the corresponding end of the bore. A spring is provided to assist fluid pressure in the bore to urge the one end of the piston toward the corresponding end of the bore. A fluid motor is provided which is adapted to urge the piston away from the end of the bore. An electrically operated valve is responsive to a signal from the logic controller of the adaptive braking system to communicate fluid pressure to the fluid motor when an incipient skidding condition is sensed, so that the fluid motor urges the piston away from the end of the bore when an adaptive braking cycle is initiated. As the piston moves away from the end of the bore, the check valve closes to thereby terminate fluid communication between the chambers, and thereafter expands the volume of the chamber communicating with the vehicle's brake actuators to thereby reduce the fluid pressure level in the latter.

8 Claims, 1 Drawing Figure

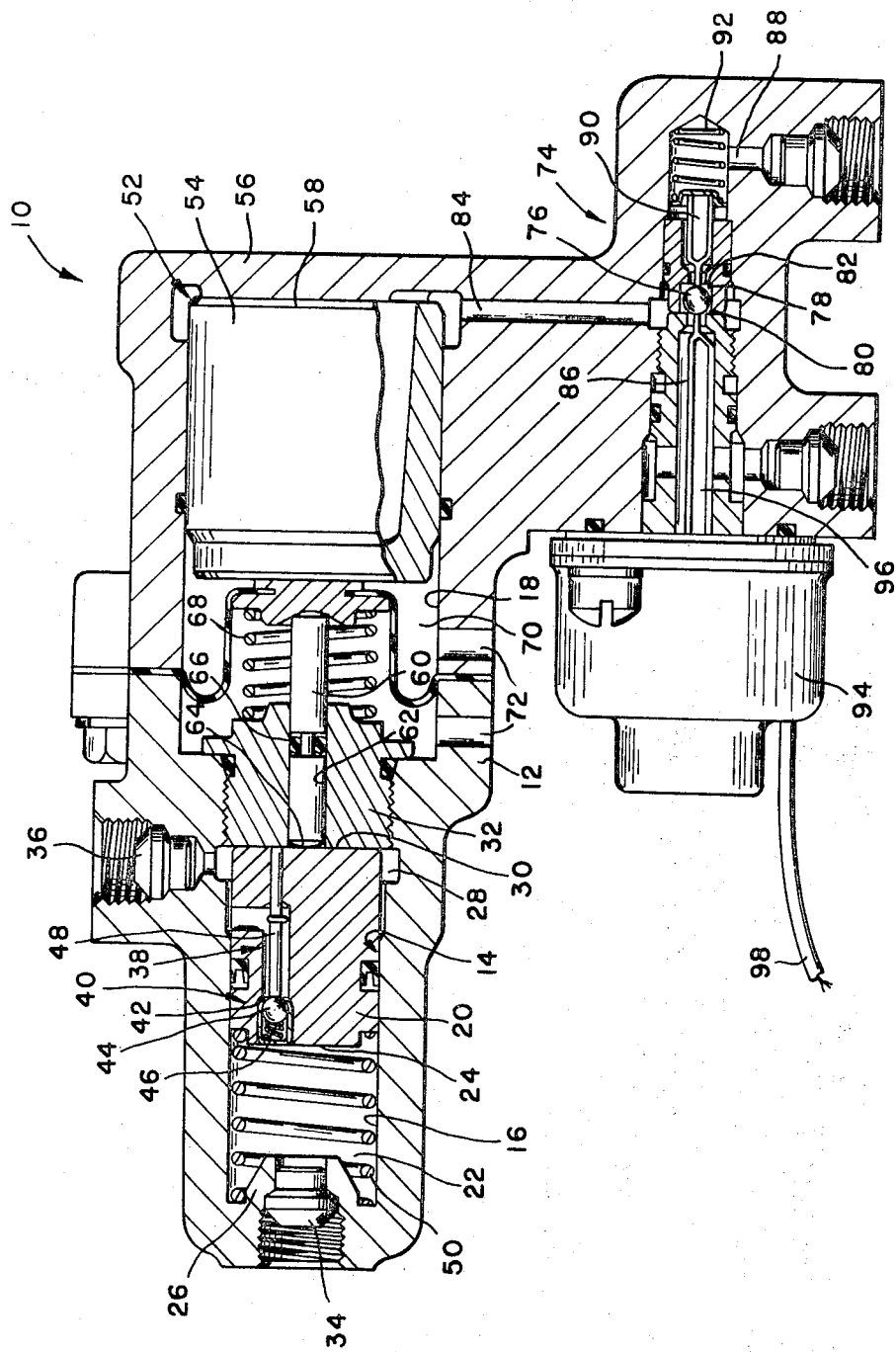

HYDRAULIC PRESSURE MODULATOR

BACKGROUND OF THE INVENTION

This invention relates to an adaptive braking modulator for a vehicle hydraulic braking system.

Although many different types of adaptive braking devices for automotive vehicles have been proposed, very few of them are in commercial use today. Perhaps the primary reason for the lack of acceptance of adaptive braking systems is their relatively high cost. One reason for this high cost is that adaptive braking systems must be "fail-safe", that is, a failure in any of the components in the adaptive braking systems must not cause a complete vehicle braking failure. Since to provide this fail-safe capability in prior art devices required quite complicated modulators having a number of different parts, the cost of these modulators has consequently been quite high.

SUMMARY OF THE INVENTION

Therefore, an important object of our invention is to provide an adaptive braking system for an automotive vehicle which is substantially less expensive than adaptive braking modulators known in the prior art.

Another important object of our invention is to provide an inexpensive adaptive braking modulator that is fail-safe, so that any failure in the adaptive braking modulator will not cause a braking failure in any of the brakes controlled by the modulator.

DESCRIPTION OF THE DRAWING

The sole FIGURE of the drawing is a transverse cross-sectional view of a modulator made pursuant to the teachings of our present invention.

DETAILED DESCRIPTION

Referring now to the drawing, an adaptive braking modulator generally indicated by the numeral 10 includes a housing 12 defining a stepped bore 14 therewithin, including a smaller diameter section 16 and a larger diameter section 18. A piston 20 is slidably mounted in the smaller diameter portion 16 of bore 14, and divides the smaller diameter portion 16 into a first chamber 22 between the end 24 of the piston and the end 26 of the bore, and a second chamber 28 defined between the opposite end of the piston 30 and a partition 32 which isolates the smaller portion 16 of the bore 14 from the larger portion 18 of the bore. An inlet port 34 communicates the chamber 22 with the vehicle's master cylinder (not shown), which is of a conventional design well known to those skilled in the art. An outlet port 36 communicates the chamber 28 with the fluid pressure actuators of the vehicle's brakes. For example, the fluid pressure actuators may be the wheel cylinders if drum brakes are used, or the disc brake caliper.

A passage generally indicated by the numeral 38 extends through the piston 20 to communicate the chamber 22 with the chamber 28. A check valve generally indicated by the numeral 40 is included within the passage 38, and includes a valve seat area 42 on the passage 38, and a valve element 44 which is adapted to engage valve seat 42. A spring 46 generally urges the valve element 44 into sealing engagement with the valve seat 42. One end of a valve actuating rod 48 carried by the piston 20 extends through the valve seat 42 and engages the valve element 44, and the other end of the actuating rod 48 projects from the end 30 of the piston 20 for engagement with the partition 32. The length of the actuating rod 48 is slightly longer than the distance between the valve seat and the end 20 of the piston 20, so that, when the piston 20 is urged into abutting engagement with the partition 32, the actuating rod 48 maintains the valve element 44 away from the valve seat 42 in opposition to the spring 46. Therefore, when the piston 20 is abuttingly engaged with the partition 32, substantially uninhibited fluid communication is permitted through the passage means 38 between the chambers 22 and 28. Therefore communication is permitted between the inlet 34 and the outlet port 36, the end 30 of piston 20 being yieldably urged into abutting engagement with the partition 32 by a spring 50.

A fluid motor generally indicated by the numeral 52 is housed in the larger diameter portion 18 of the bore 14. Fluid motor 52 includes a piston 54 which cooperates with the end 56 of the portion 18 of bore 14 to define a variable volume fluid compartment 58 therebetween. A rod 60 extends from the other end of the piston 54, and projects through an opening 62 in the partition 32 so that the end 64 of the rod 60 is disposed adjacent the end 30 of the piston 20 when the latter is urged into engagement with the partitions 32. The appropriate seals 66 are provided on the rod 60, to maintain the integrity of the chamber 28. A spring 68 is mounted in a chamber 70 defined between the left hand end of piston 54 and the partition 32 and yieldably urges the piston 54 to the right viewing the FIGURE. Appropriate vents 72 are provided to vent the chamber 30 to the atmosphere.

An electrically operated valving mechanism generally indicated by the numeral 74 controls fluid communication into the chamber 58. The valve mechanism 74 includes a valve element 76 disposed in a chamber 78 located between a first valve seat 80 and a second valve seat 82. A passage 84 communicates the chamber 78 with the compartment 58. A first passage generally indicated by the numeral 86 communicates the valve seat 80 with a fluid pressure source (not shown) which may be of any suitable type well known to those skilled in the art, and another passage 88 communicates the valve seat 82 with a fluid reservoir. A plunger 90 operated by a spring 92 yieldably maintains the valve element 76 in sealing engagement with the valve seat 80, so that normally the compartment 58 is vented to the reservoir through the passages 88. A solenoid actuator 94 includes an armature (not shown) which actuates a plunger 96 whenever an electrical current is passed through the solenoid 94. When this occurs, the plunger 96 is urged to the right, viewing the FIGURE, thereby urging the valve element 76 away from the seat 80 and into sealing engagement with the seat 82. The output terminals 98 and solenoid actuators 94 are connected to the terminals of a logic controller, (not shown) which may be of any suitable design well known to those skilled in the art and which contain logic circuitry for sensing an incipient skidding condition of a vehicle wheel and producing an output signal in response thereto which is transmitted to the solenoid actuator 94 through the terminals 98.

MODE OF OPERATION

Various components of the modulator 10 are illustrated in the positions which they assume when the brakes of the vehicle are operated normally and in the absence of an adaptive braking cycle. In this position, the spring 50 and the fluid pressure in the chamber 22 maintains the piston 20 in abutting engagement with the partition 32, so that the actuating rod 48 maintains the valve element 44 away from the valve seat 42. Therefore, substantially uninhibited fluid communication will be permitted between the inlet port 34 and the outlet port 36, permitting actuation of the brakes of the vehicle. However, when the aforementioned logic controller senses an incipient skidding condition, the latter generates an output signal which is transmitted to the solenoid actuator 94 through the terminals 98. Actuation of solenoid actuator 94 urges the plunger 96 to the right viewing the FIGURE, thereby urging the valve element 76 to the right viewing the FIGURE away from the valve seat 80 and into sealing engagement with the valve seat 82. When this occurs, high pressure fluid from the passage 86 is permitted to communicate to the passage 84 into the chamber 58. High pressure fluid in the compartment 58 acts upon the piston 54, urging the latter to the left viewing the FIGURE. Although movement of the piston 20 is resisted by both the spring 50 and the fluid pressure level in the chamber 22, the pressure level required in the compartment 58 to move pistons 54 and 20 is about the same, and may be less than the pressure level in the chamber 22, since the face of the piston 54 exposed to the fluid pressure in compartment 58 is much larger than the face of piston 20 exposed to the fluid pressure level in chamber 22. As the piston 54 moves, the end 64 of the rod 60 engages the end 30 of the piston 20, urging the latter away from the partition 32. As the piston 20 moves away from the partition 32, the actuating rod 48 moves out of engagement with the partition 32, permitting the spring 46 to urge the valve element 44 into sealing engagement with the valve seat 42, thereby terminating fluid communication between the inlet port 34 and the outlet port 36. Further movement of the piston 54 will move the piston 20 an additional distance away from the partition 32, thereby expanding the volume of the chamber 28 and therefore reducing the fluid pressure level communicated to the vehicle's brake actuators. When the logic controller determines that an incipient skidding condition no longer exists, the signal to the solenoid actuator 94 is terminated, permitting the spring 92 and plunger 90 to urge the valve element 76 out of sealing engagement with the valve seat 82 and into sealing engagement with valve seat 80. Thereafter, communication of the high pressure fluid into the compartment 58 is terminated, and the latter is vented to the aforementioned fluid reservoir through the passages 84 and 88. A spring 68, the spring 50 and fluid pressure in the chamber 22 acting upon the face 24 of piston 20, urges the piston 60, 20, and 54 to the right viewing the FIGURE until the piston 54 is disposed in the position illustrated and the end 30 of the piston 20 again engages the partition 32. When this occurs, the actuating rod 48 again urges the valve element 44 away from the valve seat 42, to again permit substantially unihibited fluid communication to the vehicle's brakes. Of course, as is evident to those skilled in the art, as the piston 20 is urged to the right after termination of the adaptive braking cycle, the fluid pressure level communicated to the vehicle's brakes is gradually increased even before the valve 30 is reopened, since as the piston 20 moves to the right, the volume of the chamber 28 is progressively reduced thereby resulting in an increase of braking pressure communicated to the vehicle's brakes.

We claim:

1. In a vehicle adaptive braking system including fluid pressure operated brakes, means for developing braking pressure for actuating said brakes, and means for sensing an incipient skidding condition of a vehicle wheel and generating a signal in response thereto, a modulator for controlling fluid communication to said brakes in response to said signal comprising:

a housing defining a bore therewithin having an inlet communicated to said brake pressure developing means and an outlet communicated to said fluid pressure operated brakes;

a piston slidable in said bore, one end of the piston cooperating with one end of said bore to define an inlet chamber communicated to said inlet port;

passage means extending through said piston to communicate said inlet chamber with said outlet;

resilient means yieldably urging said piston to the other end of said bore;

check valve means carried by said piston for controlling fluid communication through said passage means, said check valve means being responsive to the position of said piston to permit fluid communication through said passage means when said other end of said piston engages the other end of said bore, said check valve means preventing communication through said passage means when the other end of said piston is moved away from the corresponding end of said bore; and means responsive to said signal for moving piston away from said other end of said bore to thereby close said check valve means to terminate fluid communication between said inlet and outlet ports.

2. The invention of claim 1:

said outlet communicating with the chamber defined between the other end of said piston and the other end of said bore, whereby movement of said piston away from the other end of the bore first closes said check valve to terminate fluid communication to said outlet port and thereafter expands the volume of said last-mentioned chamber to reduce the fluid pressure level at said outlet.

3. The invention of claim 2:

said check valve means including a valve seat in said passage means and a valve element, resilient means yieldably urging said valve element into sealing engagement with said valve seat, and an actuating member operably connected to said valve element and projecting from said other end of the piston for engagement with the other end of the bore, said actuating member maintaining said valve element off of said valve seat when the piston engages the end of the bore, but permitting the valve element to engage the valve seat to terminate fluid communication through said passage means when the piston is moved away from the end of said bore.

4. The invention of claim 2:

said means responsive to said signal including a fluid motor, said fluid motor including an actuating rod extending through said other end of the bore and slidably and sealingly engaging said housing, and electrically operated valve means responsive to said signal for communicating fluid pressure to said fluid motor.

5. The invention of claim 4:

said fluid motor including a cylinder, said cylinder being coaxial with said bore, a fluid pressure responsive member slidable in said cylinder and cooperating with the end of the latter to define a fluid compartment therebetween, said actuating rod extending from said fluid pressure responsive member;

said electrically operated valve means shifting from a first condition venting said compartment to a second position communicating said compartment with a fluid pressure source upon generation of said signal.

6. The invention of claim 5:

said check valve means including a valve seat in said passage means and a valve element, resilient means yieldably urging said valve element into sealing engagement with said valve seat, and an actuating member operably connected to said valve element and projecting from said other end of the piston for engagement with the other end of the bore, said actuating member maintaining said valve element off of said valve seat when the piston engages the end of the bore, but permitting the valve element to engage the valve seat to terminate fluid communication through said passage means when the piston is moved away from the end of said bore.

7. In a vehicle adaptive braking system including fluid pressure operated brakes, means for developing braking pressure for actuating said brakes, and means for sensing an incipient skidding condition of a vehicle wheel and generating a signal in response thereto, a modulator for controlling fluid communication to said brakes in response to said signal comprising:

a housing defining a bore therewithin;

a partition dividing said bore into first and second sections;

a first piston slidably mounted in one of said sections and dividing the latter into a first chamber defined between one end of said housing and a second chamber defined between the opposite end of said first piston and said partition;

an inlet communicating said first chamber with the brake pressure developing means and an outlet communicating the second chamber with said brakes;

passage means extending through said first piston to communicate said frist and second chambers;

check valve means carried by said first piston for controlling fluid communication through said passage means, said check valve means being responsive to the position of said piston to permit fluid communication through said passage means when said other end of said piston engages the other end of said bore, said check valve means preventing communication through said passage means when the other end of said piston is moved away from the corresponding end of said bore; and a second piston mounted in said second section and including a member movable with said second piston extending through said partition for engagement with said other end of said first piston for shifting of the first piston upon actuation of said second piston, said second piston cooperating with the end of said housing to define a compartment therebetween;

resilient means yieldably urging said pistons toward a position maintaining said check valve open; and electrically operated valve means shiftable from a first position venting said compartment to a second position communicating high pressure fluid from a pressure source into said compartment upon operation of said signal.

8. The invention of claim 7:

said check valve means including a valve seat in said passage means and a valve element, resilient means yieldably urging said valve element into sealing engagement with said valve seat, and an actuating member operably connected to said valve element and projecting from said other end of the first piston for engagement with the other end of the bore, said actuating member maintaining said valve element off of said valve seat when the piston engages the end of the bore, but permitting the valve element to engage the valve seat to terminate fluid communication through said passage means when the first piston is moved away from the end of said bore.

* * * * *